Patented May 7, 1946

2,399,986

UNITED STATES PATENT OFFICE 2,399,986

DRILLING METHOD AND FLUID FOR USE THEREIN

Thomas S. Chapman, Chicago, Ill., assignor to Standard Oil Development Company, a corporation of Delaware No Drawing. Application July 9, 1945, Serial No. 604,084

13 Claims. (Cl. 252—8.5)

The present invention is directed to drilling muds and particularly to drilling muds which are made up with saline waters.

One of the most vexing problems in the drilling of oil wells, particularly those which go to great depths, is the prevention of the loss of water from the drilling fluid. Water has a tendency to penetrate porous formations. The ordinary oil well passes through a great many of these formations so that in the course of drilling a deep well loss of water from the mud is considerable. The importance of the problem and a laboratory method for determining the filtration properties of drilling muds are discussed in a paper entitled "Evaluation of filtration properties of drilling muds," by Milton Williams and G. E. Cannon, published in the 1938 volume of "Drilling and Production Practice," by the American Petroleum Institute, beginning at page 20.

There are several reasons why the loss of water into porous formations is undesirable and harmful. If the porous formation contains oil, the water impedes the flow of oil into the well and results in the completion of a much poorer well than if the water were not lost into the oil-bearing rock. Since electrical logs are influenced to a large extent by the fluid content of rock, the change in composition of the fluid within the pore space of rocks as the result of filtration may often result in serious errors in electrical logs. In some cases the water lost into the sands may lead to erroneous results on drill stem tests. The loss of excessive quantities of water results in the building up of a thick filter cake of mud solids on the bore-hole wall. This condition results in the hole being tight and sometimes causes the drill pipe to become stuck.

The problem of mud filtration control is particularly important and difficult in areas in which salt water must be used for the drilling mud, as in marine operations or where thick salt beds must be penetrated, as in West Texas. The salt flocculates ordinary drilling muds and causes the filtration of water to occur at excessive rates.

The object of the present invention is the production of a drilling mud which has the property of reducing loss of water by filtration to a minimum, particularly where the water is saline. This mud is characterized by the fact that under pressure in wells it forms a thin, almost impervious, filter cake opposite the porous formations.

According to the present invention, water-loss by filtration from drilling mud is reduced to a minimum by addition to the drilling mud of a gelatinized starch, or starch-containing material. Untreated starch serves no useful purpose in the diminishing of water-loss by filtration. When, however, the starch is subjected to a treatment suitable for gelatinization thereof, it exhibits a very remarkable ability for preventing filtration of water into porous formations which are traversed by a borehole.

Methods of gelatinizing starch are well known in the art. Among the most common methods may be mentioned a treatment of starch with steam in a closed chamber, treatment with caustic soda or other alkali, preferably at an elevated temperature, treatment with solutions of salts made up of strong bases and weak acids such as sodium carbonate and the like, or heating the starch with polyhydric alcohol, such as glycerol. It may be mentioned here that the addition of an alcohol, such as glycerol, will assist in any of the other gelatinizing treatments referred to.

In connection with the gelatinizing of starch with caustic, it is the practice to use the starch and the caustic in a weight ratio of about 10 to 1. For example, a mixture of 10 lbs. of starch and 1 lb. of dry caustic and 89 lbs. of water will yield, preferably after heating to a temperature of about 150° F., a gelatinized starch which is particularly useful in the practice of the present invention. It appears that the gelatinizing treatment serves to fracture the hard outer shell of the starch grains, allowing the softer inner material to expand. This gelatinized starch is not water-soluble, but forms a uniform and stable suspension with water.

The use of gelatinized starch prepared by treatment with caustic according to the present invention is not to be confused with the use of starch as a protective colloid in connection with drilling muds containing a high concentration of alkali. For example, in U. S. Patent 2,109,858 there is disclosed a drilling mud for heaving shale, the characteristic feature of which is the maintenance of high alkalinity, as by having caustic alkali present in the mud in an amount equal to at least ⅓ of 1% by weight of the total weight of the drilling mud. It will be understood that this percentage by weight is a minimum.

It was found that with such percentages of alkali in a conventional drilling mud, the solid constituents of the mud tended to be flocculated, so that a mud of undesirable consistency resulted. In order to avoid this flocculation, the patentee proposed to add a protective colloid to the mixture and indicated that this protective colloid should be used in an equal amount by weight with the caustic. According to the patent, lesser amounts of the protective colloid could be used so long as the amount used was sufficient to prevent flocculation. For instance, in one specific composition the patentee specified 2% by weight of the colloid and 7% by weight of the caustic. Among the protective colloids listed by the patentee was starch. If starch is used in connection with caustic in the manner proposed according to the present invention in the proportions of 2% by weight to 7% by weight it not only does not retard loss of water by filtration, but actually has an adverse effect. In the practice of the present invention, caustic enters the final drilling fluid only incidentally, in such amounts as are necessary to gelatinize the starch, this amount being generally of the order of $\frac{1}{10}$ of the weight of the starch.

The amount of gelatinized starch or starchy material used in the practice of the present invention is limited by other considerations, such as viscosity regulation, and, in general, should not be in excess of about 3% of the total weight of the drilling mud. Ordinarily, 1% by weight of the gelatinized starch imparts the most satisfactory filtration characteristics to the mud. The use of percentages in excess of 1% does not give a reduction in water filtration proportionate to that resulting from the addition of 1%, and in most cases the addition of more than 3% by weight of the gelatinized starch would not impart a sufficiently further reduction in the water filtration to warrant the addition.

The starch used for the purpose of the present invention can be starch from any commonly known source, such as grain of all types, particularly rice, corn and wheat, tapioca, sago, tubers, such as potatoes, etc. The starch need not necessarily be isolated from its source but the raw material itself, such as wheat flour, corn meal, rice meal, etc., may be used as such. It will be understood that where the raw material is used, such as wheat flour, the amount necessary to impart the desired effect will usually be greater than that indicated above. This is because the raw material is not 100% starch. Wheat flour, for example, is composed of about 75% starch. This material may have to be used in amounts as high as 4% or 5% by weight of the mud in order to give the desired effect.

The starch may be gelatinized at the point of use. For example, in a tank provided near the mud ditch. Since steam lines are usually available at the scene of drilling operations, the steam line may be connected with the tank as the source of heat. A practical operation would involve the use of a 10% dispersion of gelatinized starch added to the drilling mud in the proportions of about 1 barrel of starch dispersion to every 10 barrels of mud. This solution may be added to the mud either in the mixing hopper, pit, or ditch, but it is usually put directly into the pit and stirred into the mud with a mud gun. In lieu of gelatinizing the starch at the point of use, the operator may prefer to use pre-gelatinized starch available on the market as such.

A particular precaution must be observed in the use of gelatinized starch in saline muds in accordance with the present invention. It has been found that the addition of small amounts of gelatinized starch to saline mud usually aggravates the filtration problem. It is therefore important to add the starch to such muds as quickly as possible in order to build up rapidly an effective concentration of starch, which should be of the order of at least 0.5%. With some clays it may be possible to use smaller amounts as a minimum, but with the usual run of clays the effect of the starch dispersion is deleterious unless it constitutes at least 0.5% by weight of the drilling mud.

In order to demonstrate the nature and magnitude of the effect of gelatinized starch on the filtration characteristics of a drilling mud, particularly one made with saline water, experiments were conducted by synthesizing a drilling mud with 15% by weight of Aquagel in a saturated salt solution, determining the filtration rate of this mud, and comparing it to its filtration rate with additions of varying percentages of starch gelatinized by being heated with dilute caustic, the caustic being a 1% solution and being used with the starch in the proportion of 10 parts by weight of starch to 1 part by weight of dry caustic.

The filtration experiments were conducted in a Baroid low pressure wall-building tester (described in "Drilling Mud," May, 1935) and a pressure of 100 lbs./sq. in. was applied to the mud. In each test a 300 gram sample of mud was employed. The results are tabulated below. It will be noted that 0.2% of starch increased the amount of filtration, and that some place between 0.2% and 0.5% the decrease in filtration began. In this table, the amount of filtration is indicated by the number of cc's of filtrate collected with time, the cc's of filtrate being designated in vertical columns under the values for the amount of starch in the mixture. The extreme lefthand column of filtrate collected indicates the amount of filtration in the blank sample.

| Time, min. | Percent starch | | | | |
|---|---|---|---|---|---|
| | 0 | 0.2 | 0.5 | 0.6 | 0.7 |
| | Amount of filtrate in cc. | | | | |
| 2 | 45 | 51 | 15 | 9.5 | 3.5 |
| 5 | 67 | 78.5 | 25 | 19.5 | 7.5 |
| 10 | 100 | 114 | 37 | 22.0 | 11 |
| 20 | 142 | 156 | 52 | 29.5 | 18 |
| 30 | 155 | 170 | 64 | 36 | 24 |

A similar series of experiments was performed with a 300 gram sample of a drilling mud composed of saturated salt solution containing 20% by weight of a commercial clay known as Drilloid. A gelatinized starch of the type used in the previous experiment was employed. In this case it will be noted that the amount of filtration increased with additions of starch up to 0.6% by weight, and that a sharp decrease occurred between 0.6% and 1% by weight of the starch.

| Time, min. | Per cent starch | | | | | |
|---|---|---|---|---|---|---|
| | 0 | 0.2 | 0.4 | 0.6 | 1.0 | 1.5 |
| | Amount of filtrate in cc. | | | | | |
| 1 | 15.5 | 19.0 | 28.0 | 20.0 | 3.0 | 1.5 |
| 2 | | | 39.0 | 28.0 | 5.0 | 2.0 |
| 3 | 25.0 | 30.0 | | | | |
| 5 | 32.0 | 38.0 | 62.0 | 45.0 | 9.0 | 4.0 |
| 10 | 45.0 | 54.0 | 85.0 | 61.0 | 14.0 | 6.0 |
| 15 | 46.0 | 66.5 | 105.0 | 76.0 | 18.0 | 8.0 |
| 20 | 65.0 | 77.5 | 120.0 | 87.0 | 21.0 | 10.0 |
| 30 | 78.5 | 94.0 | [1]130.0 | 106.0 | 27.0 | 13.0 |

[1] Dry.

A similar set of experiments was run with a 300 gram sample of a similar mud made of Drilloid and saturated salt solution with additions of varying quantities of starch gelatinized by the action of steam. It will be noted in the following table in which the results are given that in this case the decrease in filtration began with an addition of about 0.5% by weight of the starch.

| Time, min. | Per cent starch | | | | | | | | | |
|---|---|---|---|---|---|---|---|---|---|---|
| | 0 | .2 | .3 | .4 | .6 | .7 | .8 | 1.0 | 1.5 | 2.0 |
| | Amount of filtrate in cc. | | | | | | | | | |
| 1 | 6 | 7 | 7 | 8 | 7 | 5 | 8 | 8 | 5 | 3 |
| 4 | 16 | 17 | 17 | 18 | 16 | 13 | 16 | 15 | 10 | 6 |
| 9 | 27 | 28 | 26 | 29 | 25 | 21 | 25 | 23 | 15 | 9 |
| 16 | 39 | 39 | 38 | 40 | 35 | 30 | 35 | 32 | 21 | 13 |
| 25 | 50 | 51 | 49 | 52 | 45 | 40 | 45 | 42 | 26 | 16 |
| 30 | 55 | 56 | 54 | 57 | 50 | 44 | 50 | 46 | 29 | 17 |
| 36 | 61 | 62 | 59 | 63 | 55 | 48 | 55 | 50 | 32 | 19 |

Another set of experiments was run with a 300 gram sample of the same Drilloid mud, using a starch gelatinized by being rolled with steam in the presence of caustic. The tabulated results shown in the appended table indicate that, in this case also, the decrease in filtration began after 0.4% of the starch had been added.

| Time, min. | Per cent starch | | | | | | | | | |
|---|---|---|---|---|---|---|---|---|---|---|
| | .2 | .3 | .4 | .5 | .6 | .7 | .8 | 1.0 | 1.5 | 2.0 |
| | Amount of filtrate in cc. | | | | | | | | | |
| 1 | 17 | 14 | 11 | 9 | 6 | 6 | 6 | 2 | 1 | 1 |
| 4 | 36 | 30 | 24 | 20 | 14 | 13 | 13 | 5 | 3 | 2 |
| 9 | 57 | 48 | 39 | 32 | 22 | 20 | 19 | 8 | 5 | 4 |
| 16 | 79 | 66 | 53 | 44 | 30 | 27 | 26 | 12 | 7 | 5 |
| 25 | 101 | 84 | 67 | 55 | 38 | 34 | 33 | 15 | 9 | 7 |
| 30 | 111 | 93 | 75 | 61 | 42 | 37 | 36 | 16 | 10 | 7.5 |
| 36 | 122 | 102 | 82 | 67 | 46 | 40 | 40 | 18 | 11 | 8 |
| | 115 | 97 | 77 | 63 | 42.5 | 37.5 | 36.5 | 17 | 10.5 | 8 |

Another set of experiments was conducted with a 300 gram sample of an actual drilling fluid obtained from the J. T. Moore No. 2 well in the Friendswood district at a depth of 5900 feet. This was essentially a fresh water mud and the gelatinized starch employed was the same as that used in the first set of experiments. As can be seen from the following tabulation of results, in this case there was a steady decrease in filtration with increase in starch.

| Time, Min. | Per cent starch | | | | | | | | | |
|---|---|---|---|---|---|---|---|---|---|---|
| | 0 | 0.2 | 0.3 | 0.4 | 0.5 | 0.6 | 0.8 | 1.0 | 1.5 | 2.0 |
| | Amount of filtrate in cc. | | | | | | | | | |
| 1 | 3 | 2 | 1.8 | 1.4 | 1.0 | 1.1 | 1.1 | 1.4 | 1.6 | 1.0 |
| 4 | 6.4 | 4.2 | 3.6 | 3.0 | 2.6 | 2.6 | 2.4 | 2.4 | 2.4 | 1.8 |
| 9 | 9.6 | 6.4 | 5.6 | 5.0 | 4.2 | 4.2 | 3.6 | 3.6 | 3.6 | 2.6 |
| 16 | 13.0 | 8.6 | 7.6 | 6.8 | 5.8 | 5.8 | 5.0 | 5.0 | 4.6 | 3.6 |
| 25 | 16.6 | 11.0 | 9.6 | 8.8 | 7.6 | 7.4 | 6.4 | 6.2 | 5.8 | 4.6 |
| 30 | 18.0 | 12.0 | 10.6 | 9.6 | 8.4 | 8.2 | 7.2 | 7.0 | 6.6 | 5.0 |
| 36 | 20.0 | 13.2 | 11.6 | 10.6 | 9.4 | 9.2 | 8.2 | 8.2 | 7.4 | 5.8 |
| | 18.3 | 12.1 | 10.8 | 9.8 | 8.8 | 8.8 | 7.3 | 7.0 | 6.5 | 5.0 |

Although gelatinized starch is effective in reducing the filtration rate of fresh water mud, the difficulty is encountered that in fresh water mud the starch quickly tends to ferment giving rise to disagreeable odors and to a loss of efficienecy in the reduction of filtration rate. This difficulty is not encountered in salt water muds. Therefore, the present invention contemplates the use in conjunction with starch in fresh water muds of sufficient salt, either common salt or any other salt ordinarily having a deflocculating effect on clay suspensions, to prevent fermentation of the starch. Prior to the present invention, the use of starch for improving filtration characteristics of fresh water muds was not resorted to because it was not known that salt in sufficient concentration to prevent fermentation of the starch, would not destroy the beneficial effect of the starch on the filtration characteristic of the mud. Usually about enough common salt to make about a 15% solution will be sufficient to prevent the fermentation of the starch without having any detrimental effect whatsoever on the filtration characteristics of mud.

In the foregoing discussion, reference has been made to salt and saline waters. It is to be understood that in drilling operations a wide variety of water soluble salts are encountered. Not only are large beds of sodium chloride penetrated but also beds containing calcium sulfate, magnesium sulfate, various soluble metal halides and the like. All of these various inorganic salts are comprehended by the term "salt" as used in the appended claims.

This application is a continuation-in-part of copending application Ser. No. 343,430, filed July 1, 1940.

The nature and objects of the present invention having been thus described and illustrated, what is claimed as new and useful and is desired to be secured by Letters Patent is:

1. A method for reducing water loss by filtration from a drilling mud comprising clay suspended in an aqueous medium and containing a water soluble salt having a flocculating effect on the clays in an amount sufficient to impart an undesirably high filtration rate to said mud which comprises adding to said mud gelatinized starchy material in a filtration reducing quantity.

2. A method for decreasing the filtration of water from a salt water drilling fluid in a borehole into porous formations traversed by the borehole which comprises adding to the fluid a filtration reducing amount of gelatinized starchy material.

3. A method for reducing water loss by filtration from a drilling mud comprising clay suspended in an aqueous medium and containing a dissolved salt having a flocculating effect on clays in an amount sufficient to impart an undesirably high filtration rate to said mud which comprises adding to said mud gelatinized starch in filtration reducing quantities.

4. A method for decreasing the filtration of water from a salt water drilling fluid in a borehole into porous formations traversed by the borehole which comprises adding to the fluid a filtration reducing amount of a gelatinized starch.

5. A method for reducing the filtration of water from a salt water drilling fluid into porous formations traversed by a borehole, comprising adding to the fluid a filtration-reducing amount, not more than about 3% by weight thereof, a gelatinized starch.

6. A method according to claim 1 in which the amount of gelatinized starchy material added is about 1% by weight of the drilling fluid.

7. A drilling mud for use in the drilling of porous formations comprising suspensions of clay in water containing in solution a salt, having a flocculating effect on clays, in an amount sufficient to impart an undesirably high filtration rate to said mud and a filtration reducing quantity of a gelatinized starchy material.

8. A salt water drilling fluid containing a filtration reducing amount of a gelatinized starchy material.

9. A drilling fluid comprising salt water containing a filtration reducing amount of gelatinized starch.

10. A drilling fluid for use in the drilling of porous formations comprising a concentrated salt solution containing a filtration-reducing amount, not more than about 3% by weight thereof, of a gelatinized starch.

11. A drilling fluid according to claim 10 in which the gelatinized starch constitutes at least 0.5% by weight of the drilling fluid.

12. A drilling fluid according to claim 10 in which the gelatinized starch constitutes about 1% by weight of the drilling fluid.

13. A method according to claim 5 in which the addition of starch is made rapidly until an amount thereof constituting at least 0.5% by weight of the drilling fluid is incorporated in said fluid.

THOMAS S. CHAPMAN.